(12) United States Patent
Henkel et al.

(10) Patent No.: US 11,332,156 B2
(45) Date of Patent: May 17, 2022

(54) INFORMATION DEVICE FOR INFORMING A DRIVER AND METHOD FOR INFORMING A DRIVER

(71) Applicant: Robert Bosch GmbH, Stuttgart (DE)

(72) Inventors: Achim Henkel, Stuttgart (DE); Andreas Hoertling, Leingarten (DE); Guido Funcke, Besigheim-Ottmarsheim (DE); Hartmut Loos, Hildesheim (DE); Werner Poechmueller, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 360 days.

(21) Appl. No.: 16/713,474

(22) Filed: Dec. 13, 2019

(65) Prior Publication Data
US 2020/0198656 A1   Jun. 25, 2020

(30) Foreign Application Priority Data
Dec. 20, 2018   (DE) .......................... 102018222476.5

(51) Int. Cl.
*B60W 50/14*   (2020.01)
*B60Q 9/00*   (2006.01)
*G05D 1/00*   (2006.01)

(52) U.S. Cl.
CPC .............. *B60W 50/14* (2013.01); *B60Q 9/00* (2013.01); *G05D 1/0088* (2013.01); *B60W 2050/146* (2013.01)

(58) Field of Classification Search
CPC ... B60W 50/14; B60W 2050/146; B60Q 9/00; G05D 1/0088
See application file for complete search history.

(56) References Cited

U.S. PATENT DOCUMENTS

2020/0074639 A1*   3/2020   Zhao ...................... G06V 20/56

* cited by examiner

*Primary Examiner* — Michael D Lang
(74) *Attorney, Agent, or Firm* — Norton Rose Fulbright US LLP; Gerard Messina

(57) ABSTRACT

An information device is provided for informing a driver about a driving state of a motor vehicle drivable in an automated manner, the information device including a first control device for controlling automated driving of the motor vehicle and a second control device for controlling the automated driving of the motor vehicle, a first human-machine interface unit for communicating a driving state of the automated driving of the motor vehicle to the driver and a second human-machine interface unit for communicating the driving state of the automated driving of the motor vehicle to the driver, the first control device being designed for transmitting the driving state of the automated driving to the first human-machine interface unit and the second control device being designed for transmitting the driving state of the automated driving to the second human-machine interface unit.

10 Claims, 1 Drawing Sheet

INFORMATION DEVICE FOR INFORMING A DRIVER AND METHOD FOR INFORMING A DRIVER

CROSS REFERENCE

The present application claims the benefit under 35 U.S.C. § 119 of German Patent Application No. DE 102018222476.5 filed on Dec. 20, 2018, which is expressly incorporated herein by reference in its entirety.

FIELD

The present invention relates to an information device for informing a driver and a method for informing a driver.

BACKGROUND INFORMATION

Modern vehicles are increasingly automated in their driving functions. While assistance functions (SAE level 2) always require the control of the driver, the control of the vehicle will (at least temporarily) be transferred to the automation system with the introduction of so-called piloted driving functions (SAE level 3-5, so-called automated driving or autonomous driving). Since the driver presently has to have the control over the driving process at all times in present assistance systems, present human-machine interface systems (HMI systems) are therefore not designed for the safety relevance of piloted or self-driving motor vehicles. In contrast, these vehicles have to be able to signal and communicate to the driver the driving states and ideally their transitions (for example, from the manual into the automated or self-driving driving state and back) with a high level of safety, reliability, and availability. In this way, the driver may address other activities—at least temporarily—and the driver reliably knows which driving state or mode the vehicle is in and when he has to take control over the vehicle again if necessary.

The signaling and communication of the driving states and the driving state transitions to the driver may take place via various "HMI channels", thus, for example, in a visual or auditory manner. The visual "channel" is naturally a very important component of the HMI system, the auditory "channel" having increasingly gained in significance in recent years, inter alia, because of speech input and speech control functions. The HMI system or the information device for informing the driver about the driving state of the motor vehicle drivable in an automated manner (i.e., a motor vehicle which may drive autonomously), is to have a very high level of reliability, so that the driver is always informed reliably and accurately about the driving state of the motor vehicle. Previously known systems and/or devices for informing the driver about the driving state sometimes do not have a high level of reliability, however, since the auditory, visual, and/or audiovisual devices are primarily used for entertainment and infotainment applications in the motor vehicle and these complex video, audio, and navigation systems require high-performance processors, which in turn do not meet the highest safety requirements (and also are not required to for current systems). Under unfavorable circumstances, misinformation and/or communication errors to the driver about the driving state of the automated driving of the motor vehicle may occur here.

SUMMARY

An example information device for informing a driver and an example method for informing a driver are provided according to the present invention. Advantageous refinements and improvements of the present invention result from the description herein.

Specific embodiments of the present invention may advantageously enable the driver of a motor vehicle drivable in an automated manner to be informed reliably about the driving state of the automated driving of the motor vehicle.

According to a first aspect of the present invention, an example information device is provided for informing a driver about a driving state of a motor vehicle drivable in an automated manner, the information device including a first control device for controlling the automated driving of the motor vehicle and a second control device for controlling the automated driving of the motor vehicle, a first human-machine interface unit for communicating a driving state of the automated driving of the motor vehicle to the driver and a second human-machine interface unit for communicating the driving state of the automated driving of the motor vehicle to the driver, the first control device being designed for transmitting the driving state of the automated driving to the first human-machine interface unit and the second control device being designed for transmitting the driving state of the automated driving to the second human-machine interface unit, wherein the first human-machine interface unit is designed for transmitting the driving state received by the first human-machine interface unit and/or the driving state output from the first human-machine interface unit of the automated driving to one of the control devices and/or to the second human-machine interface unit and the second human-machine interface unit is designed for transmitting the driving state received by the second human-machine interface unit and/or the driving state output from the second human-machine interface unit of the automated driving to the same control device, to which the first human-machine interface unit transmits the received driving state and/or the driving state output from the first human-machine interface unit, and/or to the first human-machine interface unit, the first and/or the second control device and/or the first and/or second human-machine interface unit being designed to compare the particular driving state transmitted by the control devices to the human-machine interface units to the particular driving state transmitted from the human-machine interface units.

One advantage thereof is that the driver may generally be informed particularly reliably about the actual driving state of the motor vehicle (inter alia, because a contradictory state may be detected and resolved). In particular, both human-machine interface units typically do not have to have a particularly high level of reliability and/or ASIL level (automotive safety integrity level). It is also possible that in general none of the human-machine interface units has a particularly high level of reliability and/or ASIL level (automotive safety integrity level). The control devices typically already have a very high level of reliability and/or ASIL level, while the human-machine interface units are to be or may be designed preferably as high-performance and simultaneously as cost-effective. Therefore, in particular the second information device or the second human-machine interface unit may generally be designed to be technically simple and cost-effective. The information device typically ensures that the driver will be or is informed about the appropriate driving state (auditory and/or visual and/or haptic). This generally enhances the safety.

According to a second aspect of the present invention, an example method is provided for informing a driver about a driving state of a motor vehicle drivable in an automated manner, the method including the following steps: transmitting the driving state from a first control device to a first human-machine interface unit for informing the driver about the driving state; transmitting the driving state from the first control device or from a second control device to a second human-machine interface unit for informing the driver about the driving state; transmitting the driving state received and/or output from the first human-machine interface unit to the first control device and/or to the second control device and/or to the second human-machine interface unit; transmitting the driving state received and/or output from the second human-machine interface unit to the first control device and/or to the second control device and/or to the first human-machine interface unit; comparing the driving state received and/or output by the first human-machine interface unit to the driving state transmitted to the first human-machine interface unit, and/or comparing the driving state received and/or output by the second human-machine interface unit to the driving state transmitted to the second human-machine interface unit.

One advantage of this method is that the driver is generally informed particularly reliably about the actual driving state of the motor vehicle (inter alia, because a contradictory state may be detected). In particular, an information device may be used in which typically both human-machine interface units do not have a particularly high level of reliability and/or ASIL level (automotive safety integrity level). It is also possible to use an information device in which in general none of the human-machine interface units has a particularly high level of reliability and/or ASIL level (automotive safety integrity level). The control devices typically already have a very high level of reliability and/or ASIL level, so that the human-machine interface units may be preferably designed as high-performance and simultaneously as cost-effective. The method may thus be carried out using particularly cost-effective devices. It is ensured by this method that the driver is informed about the appropriate driving state (auditory and/or visual and/or haptic). This generally enhances the safety.

Automated driving is to be understood in particular as autonomous driving or automatic driving of the motor vehicle, i.e., the motor vehicle drives (at least temporarily) without human intervention or without human control.

Specific embodiments of the present invention may be considered to be based on the embodiments described herein.

The present invention is based on the basic feature that a particularly reliable element of the device (control device and/or human-machine interface unit) checks whether the human-machine interface units inform the driver appropriately about the state of the automated driving. In this way, only a part of the elements of the device have to be highly reliable. Further elements of the device may be formed cost-effectively.

According to one specific embodiment of the example information device in accordance with the present invention, the first control device and/or the second control device and/or one of the human-machine interface units are designed in such a way that the first control device and/or the second control device and/or one of the human-machine interface units switches off the first human-machine interface unit or the second human-machine interface unit if the driving state transmitted to the particular human-machine interface unit does not coincide with the driving state received and/or output by the particular human-machine interface unit. This has the advantage that it is typically reliably possible to prevent the driver from being informed in a contradictory manner about the driving state of the automated driving of the motor vehicle. If the two human-machine interface units do not each have and output the appropriate driving state, the corresponding human-machine interface unit is typically switched off. This generally enhances the driving safety.

According to one specific embodiment of the example information device according to the present invention, the first and the second control device and/or one of the human-machine interface units are designed in such a way that the driving state is transmitted again from the first control device to the first human-machine interface unit if the first human-machine interface unit has received a different driving state and/or has output a different driving state than the first control device has transmitted to the first human-machine interface unit, and/or the driving state is transmitted again from the second control device to the second human-machine interface unit if the second human-machine interface unit has received a different driving state and/or has output a different driving state than the second control device has transmitted to the second human-machine interface unit. One advantage thereof is that in the event of an incorrect or inaccurate driving state in the particular human-machine interface unit, a further attempt is typically made to transmit the appropriate driving state correctly to the human-machine interface unit. In general a type of second chance thus exists for the human-machine interface unit to receive the appropriate driving state of the automated driving of the motor vehicle, namely the driving state transmitted from the first or second control device, and to inform the driver about the appropriate driving state.

According to one specific embodiment of the example information device according to the present invention, the two human-machine interface units are supplied with current independently of one another and/or the two control devices are supplied with current independently of one another. In this way, it is typically ensured that the driver is still informed about the driving state of the automated driving even in the event of a power failure. This generally enhances the safety.

According to one specific embodiment of the present invention, the first human-machine interface unit and/or the second human-machine interface unit is switched off if the driving state transmitted to the particular human-machine interface unit does not coincide with the driving state received by the particular human-machine interface unit (see above). This method has the advantage that the driver is typically reliably prevented from being informed in a contradictory manner about the driving state of the automated driving of the motor vehicle. If the two human-machine interface units do not each have and output the appropriate driving state, the corresponding human-machine interface unit is typically switched off. This generally enhances the driving safety.

According to one specific embodiment of the example method in accordance with the present invention, the first control device and/or the second control device or one of the human-machine interface units switches off the first human-machine interface unit and/or the second human-machine interface unit if the driving state transmitted to the particular human-machine interface unit does not coincide with the driving state received and/or output by the particular human-machine interface unit (see above). This has the advantage that the particular human-machine interface unit is typically switched off by a device which has a particularly high level of reliability (high ASIL level). This generally further enhances the safety.

According to one specific embodiment of the example method in accordance with the present invention, the driving state is transmitted again from the first control device to the first human-machine interface unit if the driving state transmitted to the first human-machine interface unit does not coincide with the driving state received and/or output by the first human-machine interface unit, and/or the driving state is transmitted again from the first control device or from the second control device to the second human-machine interface unit if the driving state transmitted to the second human-machine interface unit does not coincide with the driving state received and/or output by the second human-machine interface unit. One advantage of this method is that in the event of an incorrect or inapplicable driving state in the particular human-machine interface unit, a further attempt is typically made to transmit the appropriate driving state correctly to the human-machine interface unit. In general, a type of second chance thus exists for the human-machine interface unit to receive the appropriate driving state of the automated driving of the motor vehicle, namely the driving state transmitted from the first or second control device, and to inform the driver about the appropriate driving state.

According to one specific embodiment of the method according to the present invention, the two human-machine interface units are supplied with current independently of one another and/or the two control devices are supplied with current independently of one another. In this way, it is typically ensured that the driver is still informed about the driving state of the automated driving even in the event of a power failure. This generally enhances the safety.

According to one specific embodiment of the example method in accordance with the present invention, the particular human-machine interface unit communicates the driving state in an auditory, visual, and/or haptic manner to the driver. This has the advantage that the driver may be informed about the driving state via a plurality of different channels or senses. Therefore, for example, in the case of a deaf driver, the driver may be reliably informed about the driving state.

The driving states or states of the automated driving of the motor vehicle may include in particular the following (driving) states:

1. Automated driving is not available and is not active
2. Automated driving is available but is not active
3. Automated driving is active
4. Automated driving is active, driver is to take over soon
5. Mode change or driving state change is successfully completed.

It is to be noted that some of the possible features and advantages of the present invention are described herein with reference to different specific embodiments of the information device for informing a driver or the method for informing the driver. Those skilled in the art recognize that the features may be combined, adapted, or exchanged in a suitable manner to arrive at further specific embodiments of the present invention.

BRIEF DESCRIPTION OF THE DRAWINGS

Specific embodiments of the present invention are described hereafter with reference to the figures, with neither the figures nor the description to be interpreted as restricting the present invention.

The figures are solely schematic and are not true to scale. Identical reference numerals identify identical or identically-acting features in the figures.

DETAILED DESCRIPTION OF EXAMPLE EMBODIMENTS

Figure 1:
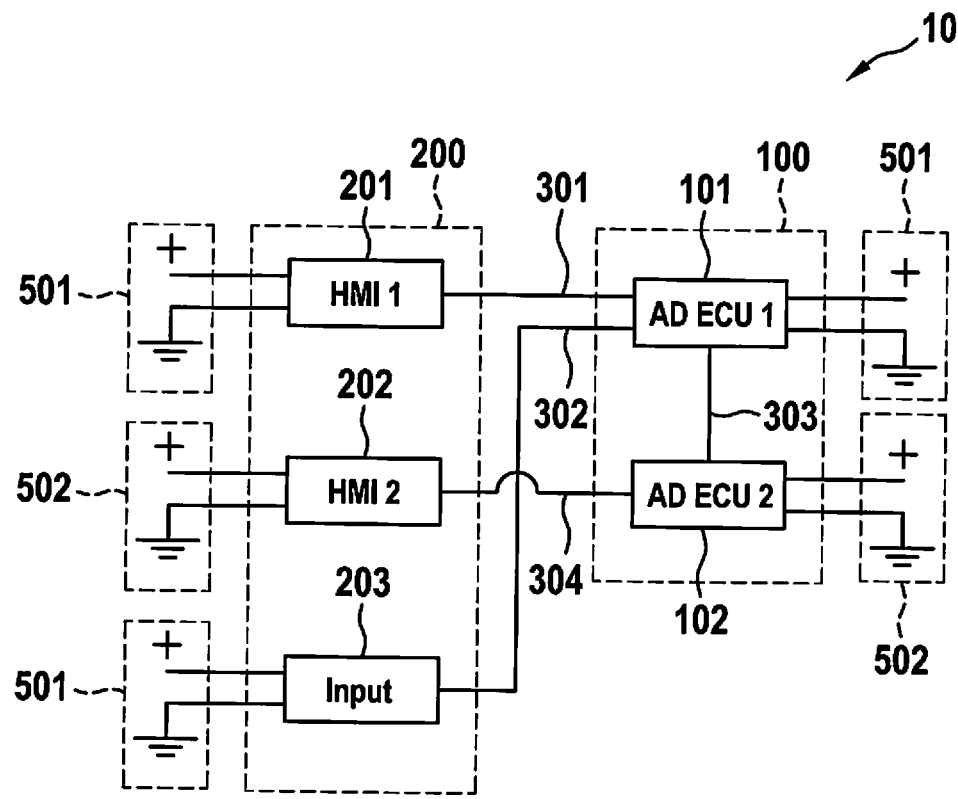
FIG. 1 shows a schematic view of one specific embodiment of the example information device according to the present invention.

FIG. 1 shows a schematic view of one specific embodiment of information device 10 according to the present invention.

Information device 10 is designed to inform a driver of a motor vehicle about the ongoing state or driving state of a motor vehicle drivable in an automated manner. The motor vehicle may drive in an automated and/or autonomous manner. The motor vehicle may also be controlled by the driver.

Information device 10 includes a human-machine communication unit 200. Human-machine communication unit 200 includes an input device 203 and two human-machine interface units 201, 202. The driver or user of the motor vehicle may input pieces of information or data into information device 10 with the aid of input device 203. For example, the intention may be input into input device 203 that control devices 101, 102 of information device 10 are to take over the control or the driving of the motor vehicle.

Information device 10 moreover includes two human-machine interface units 201, 202. Human-machine interface units 201, 202 may inform the driver in an auditory and/or visual and/or haptic manner about the ongoing driving state or a transition from one driving state into another driving state. For example, human-machine interface units 201, 202 may make statements which the driver acoustically perceives. Alternatively or additionally, the driving state may be displayed to the driver on a head-up display, on the dashboard, or at further points. Each of human-machine interface units 201, 202 may include a head unit and an instrument cluster and a head-up display and also audio systems. A haptic signal of human-machine interface unit 201, 202 may be, for example, a stuttering deceleration of the motor vehicle via the vehicle brake and/or a sudden tensioning of the safety belt and/or a movement of the seat.

Information device 10 includes a control device unit 100, which includes a first control device 101 and a second control device 102. Control devices 101, 102 control the automated or autonomous driving of the motor vehicle. The monitoring and control function of human-machine interface units 201, 202 may thus be or become integrated into control devices 101, 102 for controlling the motor vehicle.

First control device 101 is connected to second control device 102 via any type of communication, for example, connected via a direct connecting line 303. The state or driving state is exchanged between first control device 101 and second control device 102 via this connecting line 303. Control devices 101, 102 have a high level of reliability (automotive safety integrity level (ASIL)). For example, control devices 101, 102 each have ASIL C or ASIL D.

First control device 101 is connected via a connecting line 301 to first human-machine interface unit 201. Second control device 102 is connected via a connecting line 304 to second human-machine interface unit 202. This is an exemplary topology. It may also be that first control device 101 is directly connected to second human-machine interface unit 202. Input device 203 is connected to first control device 101 via a connecting line 302. It is also possible that input device 203 is connected to second control device 102 (or to both control devices 101, 102 simultaneously).

First human-machine interface unit 201, first control device 101, and input device 203 are supplied with current and voltage by a first power supply 501. Second human-machine interface unit 202 and second control device 102 are supplied with current and voltage by a second power supply 502. First power supply 501 is independent of second power supply 502, so that in the event of a failure of first power supply 501 or second power supply 502, one control device 101, 102 and one human-machine interface unit 201, 202 are still supplied with current and voltage and inform the driver about the state of the automated driving.

First control device 101 transmits the driving state of the automated driving or autonomous driving to first human-machine interface unit 201. Second control device 102 transmits the driving state of the automated driving or autonomous driving to second human-machine interface unit 202 (see above). Each of human-machine interface units 201, 202 transmits the received state, which particular human-machine interface unit 201, 202 outputs to the driver, back to particular control device 101, 102 from which the driving state was received. Since human-machine interface units 201, 202 typically do not have very high reliability and/or are formed cost-effectively, the received or output driving state may differ from the driving state transmitted from particular control device 101, 102. Control devices 101, 102 receive the driving states transmitted back by each of human-machine interface units 201, 202. First control device 101 compares the driving state transmitted to first human-machine interface unit 201 to the driving state transmitted back from first human-machine interface unit 201, i.e., to the driving state which has been received from particular human-machine interface unit 201, 202 by particular control device 101, 102 and/or to the driving state which was output by particular human-machine interface unit 201, 202. Second control device 102 compares the driving state transmitted to second human-machine interface unit 202 to the driving state transmitted back from second human-machine interface unit 202.

If there is a deviation between the received or output and transmitted driving state in the case of a human-machine interface unit 201, 202, there are two options in particular, the second option being able to be carried out alone or in addition to the first option and after it.

A first option is the retransmission of the driving state from particular control device 101, 102 to particular human-machine interface unit 201, 202, in which there is a difference between the transmitted and the received driving state. Subsequently, a retransmission back or check as to whether the appropriate driving state was correctly received or is displayed in particular human-machine interface unit 201, 202 may be carried out by particular control device 101, 102.

The second option is that human-machine interface unit 201, 202, in which there is a difference between the transmitted and the received driving state, is switched off. The switching off (for example, shutdown request) may be carried out by corresponding control device 101, 102 or control device 101, 102 associated with human-machine interface unit 201, 202. In this way, it is possible to prevent contradictory information about the driving state of the motor vehicle from being transmitted to the driver.

It is also possible that the function of checking and comparing the transmitted driving state to the received driving state is taken over by one of the two human-machine interface units 201, 202 (if it has the corresponding ASIL capability). In this case, the received driving states are not transmitted back from human-machine interface units 201, 202 to each of control devices 101, 102, but rather one of human-machine interface units 201, 202 (the one having the low level of reliability or the lower ASIL level) transmits the received driving state to other human-machine interface unit 201, 202, which has a high or higher level of reliability. This human-machine interface unit 201, 202 carries out the above-mentioned comparison. In the event of a deviation between received and transmitted driving state, this human-machine interface unit 201, 202 prompts the retransmission of the driving state from corresponding control device 101, 102 to the other human-machine interface unit 201, 202 or switches off the other human-machine interface unit 201, 202 or prompts this. Human-machine interface unit 201, 202 which carries out the described comparison may also carry out a comparison between the driving state transmitted from corresponding control device 101, 102 and the driving state displayed by this human-machine interface unit 201, 202. In this case, human-machine interface unit 201, 202 more or less checks itself, which is not problematic, however, since this human-machine interface unit 201, 202 has a very high level of reliability.

First human-machine interface unit 201 and/or second human-machine interface unit 202 may be part of an entertainment system and/or infotainment system and/or navigation system of the motor vehicle.

One of the two control devices 101, 102 may be dominant over other control device 101, 102. This means that in the event of deviations of the driving state prevailing in particular control device 101, 102, which is exchanged via connecting line 303, for example, first control device 101 may override second control device 102, i.e., second control device 102 assumes the driving state in which the motor vehicle is situated according to first control device 101. It is also possible that second control device 102 is the more dominant control device.

Figure 2:
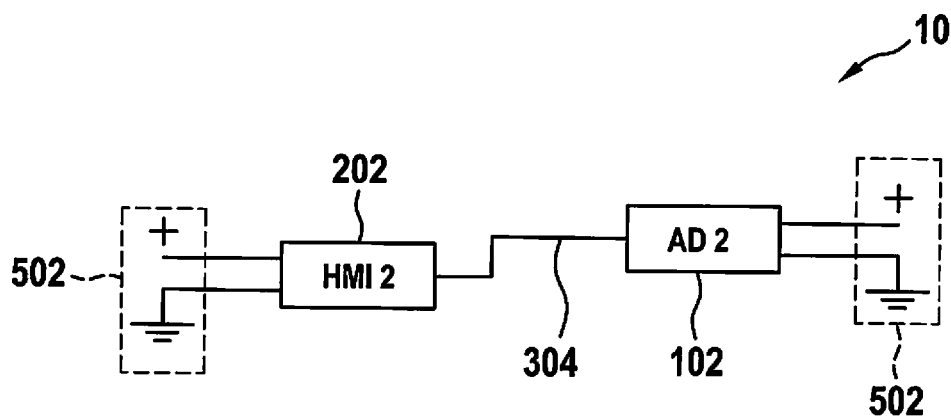
FIG. 2 shows a schematic view of the parts supplied with current of the example information device from FIG. 1 after a partial power failure.

FIG. 2 shows a schematic view of the parts of information device 10 supplied with current from FIG. 1 after a partial power failure.

One of control devices 101, 102 (second control device 102 here) and one of human-machine interface units 201, 202 (second human-machine interface unit 202 here) is also supplied with current and voltage in the event of a failure of a power supply 501, 502 (for example, first power supply 501 here). It is thus always ensured that the driver is reliably informed about the driving state of the motor vehicle.

Advantages thus result with respect to at least the three following aspects due to information device 10 according to the present invention and/or the method according to the present invention.

Safety aspect: The monitoring and control function may be integrated into a control device 101, 102, which is required in any case for the actual autonomous driving function and is highly safety relevant.

No additional hardware costs thus result, but the safety and reliability of the overall system are significantly improved.

Functional aspect: Possible contradictions/conflicts among various human-machine interface units 201, 202 are detected and resolved by a corresponding system reaction with a high level of safety and reliability.

Modular/cost aspect: The classic HMI system (for example, made up of head unit and instrument cluster, optical head-up display) does not have to be equipped with additional maximally safety-relevant functions and capabilities. Cost advantages thus result due to reusability and modularity.

A motor vehicle including such an information device 10 is also provided.

Therefore, not only may transmission errors of the driving state between control devices 101, 102 and human-machine interface units 201, 202 be recognized and corrected, but rather errors in the output of the driving states, which are correctly received by human-machine interface units 201, 202 but are output inapplicably or incorrectly to the driver, may also be recognized and corrected.

Finally, it is to be noted that terms such as "having", "including", etc. do not exclude other elements or steps and terms such as "a" or "one" do not exclude a plurality.

What is claimed is:

1. An information device for informing a driver about a driving state of a motor vehicle drivable in an automated manner, the information device comprising:
a first control device configured to control automated driving of the motor vehicle;
a second control device configured to control the automated driving of the motor vehicle;
a first human-machine interface unit configured to communicate a driving state of the automated driving of the motor vehicle to the driver; and
a second human-machine interface unit configured to communicate the driving state of the automated driving of the motor vehicle to the driver;
wherein the first control device is configured to transmit the driving state of the automated driving to the first human-machine interface unit, and the second control device being configured to transmit the driving state of the automated driving to the second human-machine interface unit;
wherein the first human-machine interface unit is configured to transmit the driving state received by the first human-machine interface unit and/or the driving state of the automated driving output by the first human-machine interface unit, to one of the first and second control devices and/or to the second human-machine interface unit;
wherein the second human-machine interface unit is configured to transmit the driving state received by the second human-machine interface unit and/or the driving state of the automated driving output by the second human-machine interface unit to the same control device to which the first human-machine interface unit transmits the received driving state and/or the driving state output by the first human-machine interface unit, and/or to the first human-machine interface unit;
wherein the first and/or the second control device and/or the first and/or second human-machine interface unit is configured to compare: (i) the driving state transmitted from the first and second control devices to the first and second human-machine interface units, to (ii) the driving state transmitted from the first and second human-machine interface units.

2. The information device as recited in claim 1, wherein the first control device and/or the second control device and/or one of the first or second human-machine interface units are configured so that the first control device and/or the second control device and/or one of the first and second human-machine interface units switches off the first human-machine interface unit or the second human-machine interface unit if the driving state transmitted to the first or second human-machine interface unit does not coincide with the driving state received and/or output by the first or second human-machine interface unit.

3. The information device as recited in claim 1, wherein the first control device and the second control device and/or one of the first and second human-machine interface units are configured (i) so that the driving state is again transmitted from the first control device to the first human-machine interface unit if the first human-machine interface unit has received a different driving state and/or has output a different driving state than the first control device has transmitted to the first human-machine interface unit, and/or (ii) so that the driving state is again transmitted from the first control device or the second control device to the second human-machine interface unit if the second human-machine interface unit has received a different driving state and/or has output a different driving state than the second human-machine interface unit has transmitted.

4. The information device as recited in claim 1, wherein the first and second human-machine interface units are supplied with current independently of one another and/or the first and second control devices are supplied with current independently of one another.

5. A method for informing a driver about a driving state of a motor vehicle drivable in an automated manner, the method including the following steps:
transmitting the driving state from a first control device to a first human-machine interface unit to inform the driver about the driving state;
transmitting the driving state from the first control device or from a second control device to a second human-machine interface unit to inform the driver about the driving state;
transmitting the driving state received and/or output by the first human-machine interface unit to the first control device and/or to the second control device and/or to the second human-machine interface unit;
transmitting the driving state received and/or output by the second human-machine interface unit to the first control device and/or to the second control device and/or to the first human-machine interface unit;
at least one of: (i) comparing the driving state received and/or output by the first human-machine interface unit to the driving state transmitted to the first human-machine interface unit, and/or (ii) comparing the driving state received and/or output by the second human-machine interface unit to the driving state transmitted to the second human-machine interface unit.

6. The method as recited in claim 5, wherein the first human-machine interface unit and/or the second human-machine interface unit is switched off if the driving state transmitted to the respective first or second human-machine interface unit does not coincide with the driving state received and/or output by the respective first or second human-machine interface unit.

7. The method as recited in claim 6, wherein the first control device and/or the second control device or one of the first or second human-machine interface units switches off the first human-machine interface unit and/or the second human-machine interface unit if the driving state transmitted to the first or second human-machine interface unit does not coincide with the driving state received and/or output by the particular human-machine interface unit.

8. The method as recited in claim 5, wherein:
(i) the driving state is transmitted again from the first control device to the first human-machine interface unit if the driving state transmitted to the first human-machine interface unit does not coincide with the driving state received and/or output by the first human-machine interface unit, and/or (ii) the driving state is transmitted again from the first control device or from the second control device to the second human-machine interface unit if the driving state transmitted to the second human-machine interface unit does not coincide with the driving state received and/or output by the second human-machine interface unit.

9. The method as recited in claim 5, wherein the first and second human-machine interface units are supplied with current independently of one another and/or the first and second control devices are supplied with current independently of one another.

10. The method as recited in claim 5, wherein the first or second human-machine interface unit transmits to the driver the driving state in an auditory manner, and/or a visual manner, and/or haptic manner.

* * * * *